ROBERT Q. BOYER,
INVENTOR.

Dec. 2, 1958 R. Q. BOYER 2,862,887
PROCESS FOR PRODUCTION AND SEPARATION OF SODIUM
SULFIDE AND SODIUM CARBONATE FROM SPENT LIQUORS
Filed Oct. 3, 1955 2 Sheets-Sheet 2
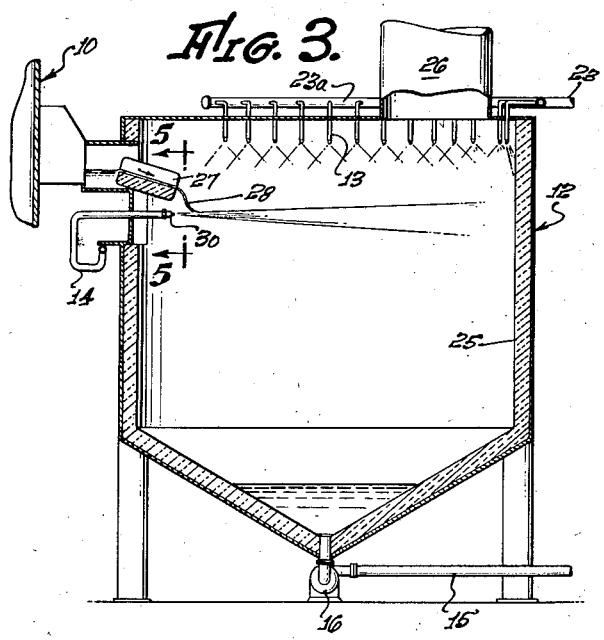
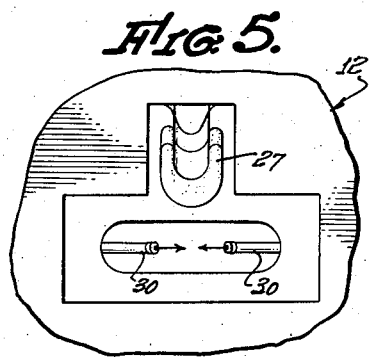
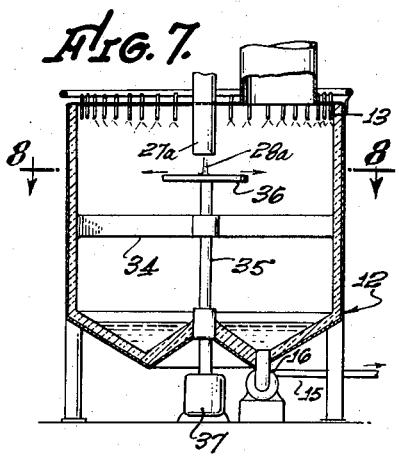
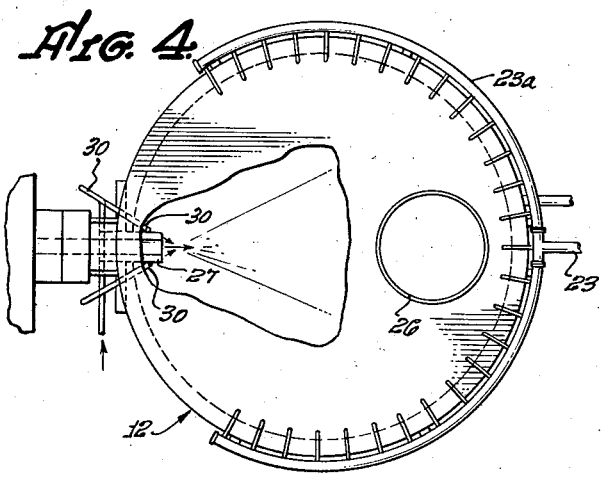
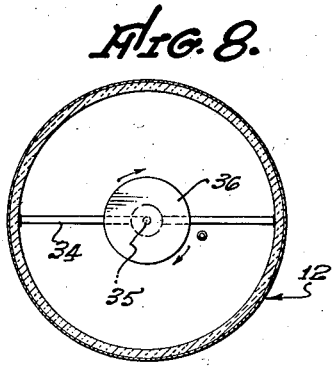
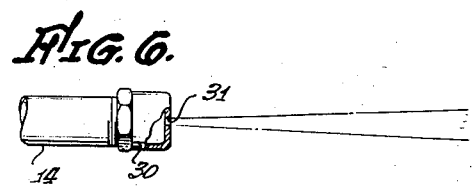
ROBERT Q. BOYER,
INVENTOR.
BY
ATTORNEYS United States Patent Office 2,862,887
Patented Dec. 2, 1958

2,862,887

PROCESS FOR PRODUCTION AND SEPARATION OF SODIUM SULFIDE AND SODIUM CARBONATE FROM SPENT LIQUORS

Robert Q. Boyer, Long Beach, Calif., assignor to Western Precipitation Corporation, Los Angeles, Calif., a corporation of California Application October 3, 1955, Serial No. 538,237

8 Claims. (Cl. 252—183)

The present invention is concerned generally with improvements in the recovery of chemicals from spent liquors resulting from various processes of pulping fibrous vegetable materials, especially pulping wood for the manufacture of paper. The invention is more particularly concerned with an improvement in the process of producing and separating solid sodium carbonate in substantially pure form from a smelt containing principally sodium carbonate and sodium sulfide and derived from the spent liquors from the sulfate, acid or neutral sodium sulfite, or kraft processes of paper making.

The several different pulping processes utilize a cooking liquor containing compounds of sodium and sulfur; and these two elements are also present in altered form in the waste or spent liquor remaining after the termination of the cooking process. One method of treating the spent liquor to recover sulfur and sodium contained therein is disclosed in my co-pending application, Ser. No. 420,307, filed jointly with Linn Bradley on April 1, 1954 for "Treatment of Sodium Base Sulfite Residual Liquor," now U. S. Patent No. 2,792,350. The present invention is an improvement in certain of the steps of that process.

In general, as part of the process of treating the spent liquors from the various pulping processes to recover the chemicals therein, the liquors, or a mixture of them, are evaporated to a combustible residue and the residue is burned in a recovery furnace. The material in the spent liquor first dries and then undergoes a decomposition of the organic compounds containing sulfur and sodium. A considerable amount, perhaps as much as half, of the organically combined sulfur escapes in volatile sulfur compounds which are ultimately burned to sulfur dioxide. The remainder of this sulfur initially forms sodium sulfate while the remainder of the sodium compounds forms sodium carbonate. The sodium compounds ultimately pass through a reducing atmosphere whereby most of the sodium sulfate, around 90%, is reduced to sodium sulfide, the remainder of the sodium sulfate remaining either unchanged or being reoxidized. The ash from the burning process consists mainly of sodium sulfide and sodium carbonate, and is readily fusible at the temperatures prevailing in the furnace so that it flows from the furnace as a highly fluid stream of molten ash. This product of the recovery furnace is hereinafter referred to as the "smelt."

Various methods are known for treating this smelt to recover usable chemicals from it, one example being the Patent No. 2,642,399, issued June 16, 1953, to Aries and Pollak. However, the process of that patent is not suited to the production of sodium carbonate of the high degree of purity required for certain purposes.

It is a general object of the present invention to treat the molten smelt in such a manner as to effect substantially complete solution of the smelt in an aqueous medium, and then to crystallize the sodium carbonate in substantially pure solid form, permitting its removal from the solution and from the sodium sulfide solution.

According to my improved process, this object is achieved by continuously discharging the smelt from the recovery furnace as a stream of liquid smelt which is continuously broken up or subdivided in a manner to produce a very fine product. This fine product quickly solidifies and in solid form is added to an aqueous medium, typically and preferably a relatively dilute solution of sodium sulfide wherein the solidified material dissolves substantially completely. The result is a concentrated solution containing both sodium sulfide and sodium carbonate from which the sodium carbonate is removed by a crystallizing step. Substantially pure sodium carbonate crystals are formed in a crystallizer and removed therefrom, effecting separation of the sodium sulfide and the sodium carbonate. If desired, the sodium carbonate crystals may be washed to remove all the sodium sulfide except for a very small amount. The sodium sulfide from the smelt remains in the concentrated solution withdrawn from the crystallizer. This concentrated solution is divided into two fractions, one of which is withdrawn from the process and the other of which is diluted by the addition of water, such as the wash water derived from washing the crystallized sodium carbonate to form the dilute solution of sodium sulfide to which the finely divided solid smelt is added in order to carry on a continuous process.

In a preferred form of apparatus for carrying out my improved process, the stream of liquid smelt from the furnace is introduced into a dispersion chamber where the liquid smelt is formed into a freely falling stream. This stream of smelt is then blown with a steam jet moving at a very high velocity so that the liquid smelt is broken up into very fine threads or other particles which quickly cool and solidify and are carried by the force of the steam jet to a solution of sodium sulfide. The dispersion chamber has upwardly extending walls, which are preferably vertical at least in part, and the sodium sulfide solution is passed through sprays which maintain a thin film of sodium sulfide solution flowing down the inner surface of these side walls. The force of the steam jet blows the fine particles of solidified smelt against this film of sodium sulfide solution in which the finely divided solid material is quickly dissolved. Dissolution of the solid material starts but is not necessarily completed inside the dispersion chamber. Dissolving action continues as the solution to which the finely divided solid material has been added is pumped from the dispersion chamber into the crystallizer and also continues in the crystallizer. The pump further agitates the solution and any solid material therein, tending to break up threads of the smelt and thus facilitate solution.

In the crystallizer sodium carbonate crystallizes out of the concentrated solution. The crystals are removed from the crystallizer and may be transferred to a washer to remove the adhering solution and improve purity of the final product. The concentrated solution is withdrawn from the crystallizer; and means are preferably provided for diluting and recycling at least a portion of the concentrated solution.

How the above and other objects and advantages of my invention are achieved, will be more readily understood by reference to the folowing description and annexed drawing in which:

Fig. 3 is a vertical median section through a dispersion chamber of preferred construction;

Fig. 4 is a plan view of the dispersion chamber of Fig. 3 with a part of the cover broken away;

Fig. 5 is a fragmentary vertical elevation of the smelt spout and jet means as on line 5—5 of Fig. 3;

Fig. 6 is a fragmentary elevation and section of one of the steam nozzles;

Fig. 7 is a vertical median section through a dispersion chamber showing a modified design thereof; and Fig. 8 is a horizontal section on line 8—8 in Fig. 7.

Figure 1:
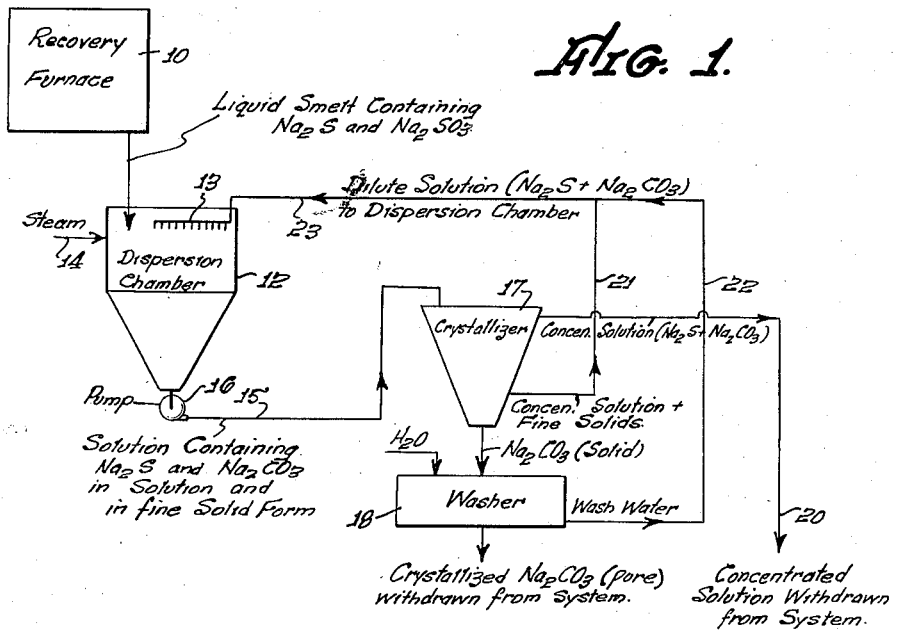
Fig. 1 is a flow sheet illustrating diagrammatically both the various steps of my improved process and the apparatus for carrying it out.

In the flow sheet of Fig. 1, the recovery furnace is indicated at 10. This furnace may be of any conventional design in which the combustible residue from the spent liquors is burned. The ash formed by the combustion process is discharged from the furnace as a stream of liquid smelt containing principally sodium sulfide and sodium carbonate, along with some other constituents in minor quantities. This stream of liquid smelt is introduced directly into the dispersion chamber 12.

The dispersion chamber can be a tank of any desirable construction having upstanding side walls. Near the upper edge of the walls there is arranged a series of liquid sprays 13 which are so directed and located as to spray liquid over at least a portion of the upstanding walls of the chamber so that a continuous liquid film is maintained flowing down the walls.

Within the dispersion chamber the stream of liquid smelt is very finely subdivided in any suitable manner as will be described in more detail later, although a preferred method of finely subdividing the stream of liquid smelt is blowing it with a jet of high velocity steam introduced by steam line 14. The smelt is subdivided into a very finely divided form which is carried across the chamber by the force of the steam jet or other subdividing means, to be delivered to the liquid film on the walls of the dispersion chamber. The steam jet is sufficiently spaced from the film on the walls of the chamber and the average temperature in the chamber is sufficiently low that the finely divided smelt cools to the point of solidification before it reaches the liquid film on the walls of the chamber.

An advantage of very finely dividing the smelt is that when the smelt in finely divided condition is added to the liquid film, the solid material is quickly and substantially entirely dissolved in the liquid, even in the presence of macroscopic crystalline sodium carbonate. For economic reasons, the liquid is preferably a dilute solution of sodium sulfide derived from a later step in this process, as will be mentioned later, at an initial temperature of about 140° to 180° F. Dissolving the solid material takes an appreciable length of time and is not necessarily complete within the dispersion chamber, but ordinarily also takes place as the solution containing solid particles moves through line 15 and pump 16 to crystallizer 17, and may not be completed until after the particles reach the crystalizer.

To obtain the desired completeness and rapidity of dissolving, the smelt is reduced to particles which have at least one very small dimension. Thus it is preferred to blow the stream of liquid smelt into very fine threads or filaments which average about 100 microns or less in diameter; and at least it is desirable to conduct the blowing in such a manner and under such conditions that the diameter of these filaments does not exceed about 200 microns. This insures that all particles of the solid smelt dissolve easily and rapidly in the solution to which they are added. My invention is not limited to producing particles of smelt of any particular size or shape, but the liquid smelt forms mostly filaments rather than spheres or the like. This is satisfactory as long as the diameter of the threads is kept small.

As the smelt is added to and dissolves in the solution, the concentration of both sodium sulfide and sodium carbonate increase, but the solution first becomes saturated with respect to sodium carbonate. In crystallizer 17, the liquid and solids are retained long enough for the very finely divided smelt to completely dissolve. The fine state of subdivision causes the smelt to dissolve even though the solvent is macroscopically saturated with respect to sodium carbonate because sodium carbonate continuously comes out of solution in larger crystals that are substantially pure. This action occurs according to well recognized principles of differential solubility of a substance as related to size and physical state. (For reference see "Solubility of Nonelectrolytes" by Hildebrand and Scott, A. C. S. Monograph Series No. 17, third edition, 1950, at page 417).

The liquid introduced into the dispersion chamber is heated therein by heat from the steam and from the smelt, and the temperature of the solution reaching the crystallizer will vary with conditions present in each installation, but the process operates very satisfactorily if the temperature is about 180° F., though any temperature between 140° F. and the boiling point of the solution is operative. It should be noted that in the crystallizer the temperature of 180° can easily be maintained substantially constant and that the crystallizing step is carried out under substantially isothermal conditions. The same may be said to be true of the dissolving step since the temperature of the solution in the bottom of the dispersion chamber is substantially the same as in the crystallizer. Of course some heat is lost through normal radiation losses. It is unnecessary to go through an evaporative cycle for either the dissolving or crystallizing steps, and therefore no heat need be added or removed to effect solution of the solid material or the reappearance of sodium carbonate in solid form, so that the dissolving and crystallizing steps may be characterized as being carried out under substantially adiabatic conditions.

As the sodium carbonate crystallizes out of the solution, it forms crystals that are much larger than the fine particles of smelt dissolved in the solution, the crystals being several times the diameter of the filaments formed by the steam jet. The crystals can be removed continuously or intermittently, being transferred to washer 18. In the washer, it is preferable to wash the crystallized sodium carbonate with fresh water in order to remove any remaining sodium sulfide solution and improve the purity of the solid product.

The solution leaving crystallizer 17 contains the sodium sulfide from the smelt, and some of the sodium carbonate. Separation of the solid phase from the liquid phase in the crystallizer represents separation of the sodium carbonate and sodium sulfide. Although the solution leaving the crystallizing step is saturated with respect to sodium carbonate, this is but a small part of the whole and may be beneficial in later use of the solution. This solution leaving the crystallizing step is referred to as concentrated sodium sulfide solution as this compound is the one of chief interest in the solution. A portion of this concentrated sodium sulfide solution is withdrawn from the system through line 20 to be used for any desired purpose. This solution may be withdrawn at or near the top of crystallizer 17 to minimize the presence of any solids in the solution. Another part of the concentrated solution may be withdrawn at a lower point in the crystallizer along with some undersized fine solids, and passes through line 21 to be reused in this process. Alternatively, both portions of the solution may be withdrawn at the same level of the crystallizer. This latter portion of the concentrated solution is diluted to the desired strength as by the addition to it of the wash water removed from washer 18 through line 22. It is this portion of the concentrated sodium sulfide solution which is recycled. The diluted solution is returned by line 23 to sprays 13 which introduce it into the dispersion chamber.

Although my improved process is in no way limited to being carried out in any particular type of apparatus, I have found that certain designs of apparatus are especially advantageous for this process. For this reason I illustrate in Figs. 3–5 a preferred form of dispersion chamber with a steam jet arrangement for blowing the molten smelt.

In Fig. 3, the dispersion chamber is of cylindrical cross section and has vertical side walls 25. The tank is covered and provided with a vent 26 to exhaust steam and vapors. The bottom of the tank is conical in shape with a central drain which is connected to the intake of centrifugal pump 16. Around the top of side walls 26 then is arranged a plurality of sprays 13 connected to header pipe 23a which receives dilute sodium sulfide solution from pipe 23. The sprays are located close to the inside face of wall 25 so that the sprays direct the solution on to the inner surface of the side walls and maintain a continuous film of liquid which runs by gravity down the inner face of the wall.

At one side of dispersion chamber 12, there is located an inlet for the molten smelt which is received from recovery furnace 10. At the temperatures normally encountered in operation, around 1600° F., the smelt has a viscosity comparable to that of water and flows freely down an inlet trough made of a suitable ceramic material. The trough terminates inside the dispersion chamber at spout 27 so that the liquid smelt falls from the inner end of the spout in a freely falling stream as indicated at 28.

Directly underneath the inlet for the liquid smelt is the means for breaking up the stream of liquid smelt into very finely divided form. In this preferred form of this apparatus, there is provided steam jet means comprising a plurality of separate nozzles 30. Although there may be more than two jets 30, only two are shown in the drawing. The two jets are directed horizontally at an angle to each other so that they intersect in the vicinity of the freely falling stream of smelt. Actually, it has been found advantageous for the two jets from nozzles 30 to intersect each other at a point a short distance on the opposite side of the falling stream from the nozzles 30 so that all the liquid smelt is drawn into the converging streams of steam where it is finely dispersed.

Most favorable results are obtained when blowing the liquid smelt with a steam jet if the relative velocity of the steam and liquid smelt is equal to or greater than the velocity of sound. Although at lower velocities the stream of smelt may be broken up into fine enough particles, the dispersing action of the jet is improved and the particles produced are much finer if the velocity of the steam relative to the smelt reaches a sonic velocity. As used herein, the term "sonic velocity" is used to refer to a relative velocity equal to or greater than the velocity of sound under the conditions existing within the dispersion chamber. Although the reasons for this improved action are not known certainly, it is believed that there is a shock effect achieved at these higher relative velocities that is effective in reducing the particle size of the smelt. Thus the filaments of smelt produced under these favorable conditions are of an average diameter in the neighborhood of 100 microns or less.

The pipe 14 bringing steam to nozzle 30 preferably has a relatively large diameter compared with the size of the orifice 31, as shown in Fig. 6, in order to avoid undue friction losses as the steam flows through the pipe. In this way, a higher velocity of steam in the jets is obtained for a given pressure maintained in pipe 30. The jet means is spaced sufficiently far from the opposite side walls over which the liquid film flows that the finely divided smelt has time to cool to the point of solidification before it reaches the liquid film. The smelt solidifies at around 1350°–1400° F., and the temperature in chamber 12 is much lower than this to permit rapid cooling. Because of the very small size of the particles produced these particles cool very rapidly and the distance from the jet to the liquid film need not be very great, a distance in the neighborhood of 5 to 7 feet being sufficient.

It is a feature of my invention that the finely divided smelt is solidified before it is added to the liquid. Under these conditions there is no possibility of any explosion or eruption in the slurry initially produced by adding smelt to liquid. This same difficulty has been encountered in previous systems of handling the liquid smelt because of the relatively high temperature and the liquid form of the smelt at the time it is added to the sodium sulfide solution.

The film of sodium sulfide solution on the side walls of the tank may be relatively thin because of the speed with which it moves. It presents a relatively large surface for receiving the particles of solidified smelt. Both of these factors also contribute to elimination of any condition able to cause an explosion or eruption as the smelt is added to the liquid. These conditions also promote rapid dissolving action and a considerable amount of the solid material is dissolved in the sodium sulfide solution before the solution reaches the crystallizer. Long filaments of smelt are broken up in passing through pump 16, which is preferably the centrifugal type, so that the action of the pump is to produce an agitation of the undissolved smelt and the solvent in addition to a conveying action.

Crystallizer 17 and washer 18 may be of conventional design and accordingly need no particular description here. In the crystallizer, substantially all the remainder of the finely divided smelt is dissolved in the sodium sulfide solution so that the solution becomes saturated with respect to sodium carbonate and the sodium carbonate then recrystallizes out of solution. This is carried on as a continuous process. The crystals grow in size as the retention time increases, the largest crystals therefore being lowest in the crystallizer. Accumulated sodium carbonate crystals can be removed from the bottom of the crystallizer and transferred to washer 18 where they may be washed free of adhering sodium sulfide solution by adding fresh water. The washed crystals of sodium carbonate are then withdrawn from the process by removing them from the washer. It has been found that this process is able to produce sodium carbonate crystals that are 98% pure sodium carbonate. Since the contaminants do not exceed 2% of the product, the sodium carbonate produced by this process has a sufficiently high degree of purity to be acceptable for use, without further refining or purification, for recovering sulfur for the preparation of a cooking liquor used in the original process of pulping wood or for other processes.

Figure 2:
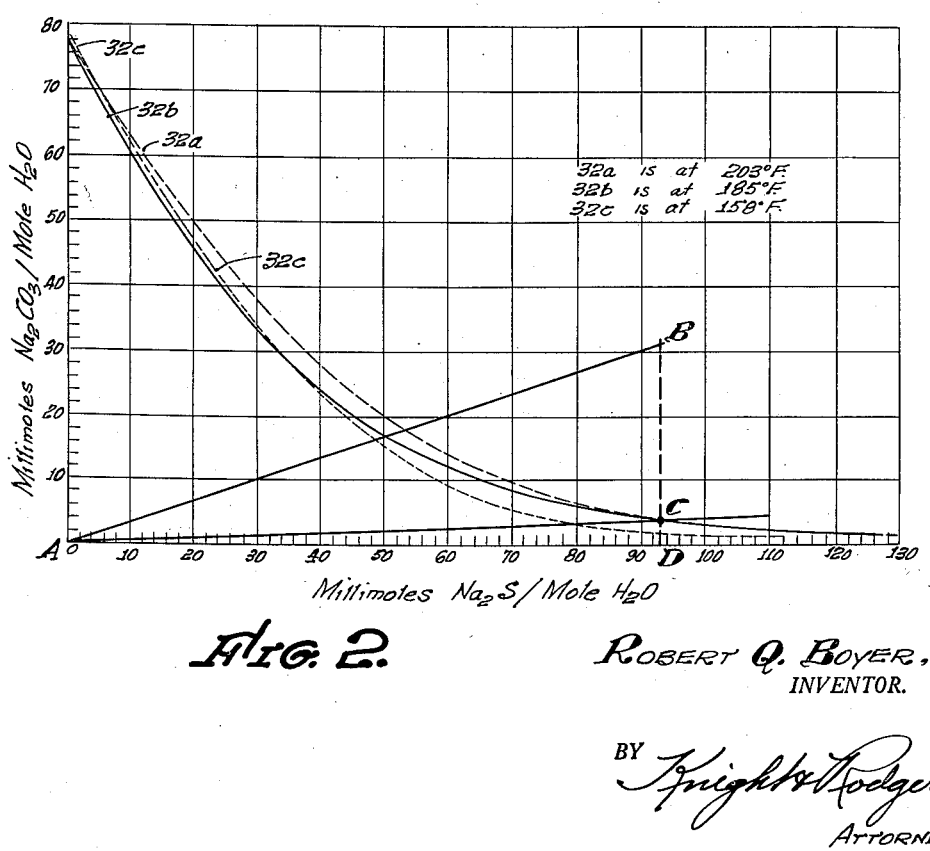
Fig. 2 is a phase diagram of the concentrated sodium carbonate-sodium sulfide-water solution for three temperatures.

The solution when drawn from the crystallizer is concentrated with respect to the sodium compounds, and is saturated with respect to sodium carbonate. To conserve on the water requirements and increase the yield of chemicals recovered, it is preferable to introduce a dilute solution of sodium sulfide and carbonate into the dispersion chamber. This is obtained by diluting the concentrated solution before being returned to the dispersion chamber through sprays 13. This may be accomplished either by the addition of fresh water or by wash water from washer 18, through line 22. The amount of water added to the system in proportion to the amount of smelt added controls the amount of pure crystalline sodium carbonate produced. This in turn is related to the composition of the smelt introduced into the dispersion chamber. In order to determine the quantitative relationships existing I have determined the solubility relationships of the system sodium sulfide-sodium carbonate-water. A sufficient number of determinations have been made to permit construction of the phase diagram in Fig. 2.

The phase diagram is constructed by plotting solubility of smelt of varying composition at a given temperature using the X-axis to represent millimoles of sodium sulfide per mole of water and the Y-axis to represent millimoles of sodium carbonate per mole of water. Three solubility curves have been plotted, the curves 32a, 32b, 32c representing solubilities at 203° F., 185° F., and 158° F., respectively.

The amount of water required to produce a desired separation of crystalline sodium carbonate from the sodium sulfide may be determined from this phase diagram. Line A—B is constructed with its slope equal to the mole ratio of sodium carbonate to sodium sulfide in the smelt; in this case 1 to 3. A perpendicular is erected at D from the sodium sulfide axis to the smelt ratio line A—B. Its location along the sodium sulfide axis is determined by the ratio of sodium carbonate to be produced in crystalline form to the sodium carbonate it is desired to leave in solution. The intersection of the perpendicular B—D with any solubility line divides this perpendicular into two sections. The upper section from the solubility curve to the smelt ratio line divided by the lower section of the line from the sodium sulfide axis to the solubility curve, is equal to the ratio of sodium carbonate obtained in crystalline form to the sodium carbonate removed from the system in solution along with the concentrated sodium sulfide. The relationship of net water added and smelt introduced into the system is determined by the coordinates at the intersection B of the smelt ratio line with the perpendicular. This ratio is the numerical value of either coordinate of this point based on either component of the entering smelt. The coordinates of the intersection of the perpendicular with the solubility curve are the numerical values of the proportions of the chemical components of the saturated sodium sulfide solution.

For example, with smelt having a ratio of one mole of sodium carbonate to three moles of sodium sulfide, the line A—B is drawn having a slope of ⅓. It is desired to remove as crystalline material ⅞ of the sodium carbonate entering the system. The temperature of the crystallizer is at 185° F. so the 185° F. solubility line 32b is used. The line B—D is so constructed that it intersects the solubility curve 32b at C, and the section B—C divided by C—D is equal to 7. The net water added to the system is one pound mole of water for each 0.031 pound mole of sodium carbonate entering in the smelt or equally it is one pound mole of water for each .093 pound mole of sodium sulfide, each value being a coordinate of point B. The composition of the concentrated sodium sulfide solution withdrawn from the system is then .0038 pound mole of sodium carbonate and .093 pound mole of sodium sulfide per pound mole of water, these two values being the coordinates of point C. The amount of solution withdrawn from the system contains the same amount of water as the net water added. The net water added to the system is the total water added to the system less the evaporative loss and the entrained wash water in the crystallized sodium carbonate.

There is shown in Figs. 7 and 8 a dispersion chamber equipped with variational means for finely subdividing the smelt. In this form the dispersion chamber is provided with a transverse beam 34 that carries a bearing for shaft 35 that supports and rotates disc 36. The shaft is driven by motor 37 which is arranged with its axis vertical and disc 36 is arranged to revolve in a horizontal plane. Disc 36 is underneath the freely falling stream of molten smelt 28a from spout 27a to receive the smelt on the top surface of the disc. The disc is revolved at a high speed and throws off the molten smelt in the form of threads or filaments which are thrown against the film of liquid flowing over the inside surface of the side walls of the dispersion chamber. In this case the finely divided particles of smelt may be directed at all portions of the side walls so that sprays 13 are arranged around the entire periphery of the side walls rather than merely over that part against which particles of smelt are directed. Otherwise the arrangement for forming a liquid film on the side walls of the chamber is the same as previously described.

In this form of apparatus it is also desirable to achieve a sonic relative velocity between the stream of smelt and the rotating disc consequently, the speed of revolution of the disc is sufficiently great that the peripheral velocity of the disc, i. e. at the point where the smelt leaves the disc, is equal to or greater than the speed of sound under the conditions encountered within the dispersion chamber.

From the foregoing description it will be seen that various changes in my improved method and apparatus for carrying out the method may occur to persons skilled in the art but without departing from the spirit and scope of my invention. Consequently it is to be understood that the foregoing description is considered to be merely illustrative of, and not limitative upon, the appended claims.

I claim:

1. The process of treating smelt derived from spent liquor containing sodium carbonate and sodium sulfide to separate sodium carbonate from the sodium sulfide, that includes the steps of subdividing and solidifying the liquid smelt to produce a very finely divided solid material; adding the finely divided solid smelt to an aqueous medium and dissolving substantially all the finely divided smelt in the aqueous medium to produce a concentrated solution of sodium sulfide and sodium carbonate; crystallizing sodium carbonate out of said concentrated solution; and separating the solid crystallized sodium carbonate from the concentrated solution to leave a concentrated solution containing the sodium sulfide.

2. The process as in claim 1 in which the dissolving and crystallizing steps are carried out under substantially isothermal conditions.

3. The process as in claim 1 in which the dissolving and crystallizing steps are carried out under substantially adiabatic conditions.

4. The process of treating smelt derived from spent liquor containing sodium carbonate and sodium sulfide to separate sodium carbonate from the sodium sulfide that includes the steps of subdividing and solidifying the liquid smelt to produce a very finely divided solid material in filamentary form having a least dimension not over about 200 microns; forming a thin flowing stream of aqueous medium; adding the finely divided solid smelt to said flowing stream and dissolving substantially all the finely divided smelt in the aqueous medium to produce a concentrated solution of sodium sulfide and sodium carbonate; crystallizing the sodium carbonate out of said concentrated solution; and separating the solid crystallized sodium carbonate from the concentrated solution to leave a concentrated solution containing the sodium sulfide.

5. The process of treating smelt derived from spent liquor containing sodium carbonate and sodium sulfide to separate sodium carbonate from the sodium sulfide that includes the steps of subdividing and solidifying the liquid smelt to produce a very finely divided solid material; adding the finely divided solid smelt to a dilute solution of sodium sulfide and dissolving substantially all the finely divided smelt in the dilute solution to produce a concentrated solution of sodium sulfide and sodium carbonate; crystallizing sodium carbonate out of said concentrated solution; separating the solid crystallized sodium carbonate from the concentrated solution to leave a concentrated solution containing the sodium sulfide; washing the separated crystallized sodium carbonate with water; adding the wash water from the last step to at least a portion of the concentrated solution to form said dilute solution; and recycling the diluted solution.

6. The process of treating smelt derived from spent liquor containing sodium carbonate and sodium sulfide to separate sodium carbonate from the sodium sulfide that includes the steps of blowing a stream of the liquid smelt with a jet of steam to break up the smelt into very finely divided form; allowing the smelt in the finely divided form to solidify; adding the finely divided solid smelt to an aqueous medium and dissolving substantially all the finely divided smelt in the aqueous medium to produce a concentrated solution of sodium sulfide and sodium carbonate; crystallizing sodium carbonate from said concentrated solution; and separating the solid crystallized sodium carbonate from the concentrated solution to leave a concentrated solution containing the sodium sulfide.

7. The process of treating smelt derived from spent liquor containing sodium carbonate and sodium sulfide to separate sodium carbonate from the sodium sulfide that includes the steps of blowing a stream of the liquid smelt with a jet of steam moving at sonic velocity relative to the stream of liquid smelt when striking the liquid smelt, to reduce the smelt to very finely divided form; allowing the smelt in the finely divided form to solidify; adding the finely divided solid smelt to a dilute solution of sodium sulfide and dissolving substantially all the finely divided smelt in the dilute solution to produce a concentrated solution of sodium sulfide; crystallizing sodium carbonate out of said concentrated solution; and separating the solid crystallized sodium carbonate from the solution to leave in the concentrated solution the sodium sulfide.

8. The process of treating smelt from spent liquor containing sodium carbonate and sodium sulfide to separate sodium carbonate in solid form from the sodium sulfide, that includes the steps of subdividing and then solidifying the liquid smelt to produce a very finely divided solid material; adding the finely divided solid material to an aqueous solution of sodium sulfide and sodium carbonate; dissolving substantially all the finely divided solid material in the solution to produce a concentrated solution of sodium sulfide and sodium carbonate that is macroscopically supersaturated with respect to sodium carbonate; crystallizing sodium carbonate out of the concentrated solution under substantially adiabatic conditions; and separating solid crystallized sodium carbonate from the concentrated solution to leave a solution containing the sodium sulfide added from the smelt and some sodium carbonate.

References Cited in the file of this patent

UNITED STATES PATENTS

| | | |
|---|---|---|
| 1,601,897 | Wiley et al. | Oct. 5, 1926 |
| 1,676,277 | Mumford | July 10, 1928 |
| 1,906,886 | Richter | May 2, 1933 |
| 2,000,038 | Schmalenbach | May 7, 1935 |
| 2,178,694 | Muskat et al. | Nov. 7, 1939 |
| 2,326,099 | Koratnur et al. | Aug. 3, 1943 |
| 2,549,848 | Otto | Apr. 24, 1951 |
| 2,555,337 | Hamm | June 5, 1951 |
| 2,640,762 | Wiseman | June 2, 1953 |
| 2,642,399 | Aries et al. | June 16, 1953 |
| 2,738,270 | Nelson et al. | Mar. 13, 1956 |